(12) United States Patent
Nakatsuji (10) Patent No.: US 8,120,319 B2
(45) Date of Patent: Feb. 21, 2012

(54) SET BATTERY CONTROL METHOD AND SET BATTERY CONTROL CIRCUIT AS WELL AS CHARGING CIRCUIT AND BATTERY PACK HAVING THE SET BATTERY CONTROL CIRCUIT

(75) Inventor: Toshiyuki Nakatsuji, Hyogo (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 12/517,488

(22) PCT Filed: Dec. 12, 2007

(86) PCT No.: PCT/JP2007/073915
§ 371 (c)(1),
(2), (4) Date: Jun. 3, 2009

(87) PCT Pub. No.: WO2008/072650
PCT Pub. Date: Jun. 19, 2008

(65) Prior Publication Data
US 2010/0019725 A1    Jan. 28, 2010

(30) Foreign Application Priority Data
Dec. 14, 2006  (JP) .................................. 2006-337182

(51) Int. Cl.
*H02J 7/00* (2006.01)
(52) U.S. Cl. ....................................... 320/115; 320/120
(58) Field of Classification Search .................... 320/118
See application file for complete search history.

(56) References Cited

U.S. PATENT DOCUMENTS

| 5,886,502 | A | 3/1999 | Higashijima | |
|---|---|---|---|---|
| 6,960,899 | B2 * | 11/2005 | Kobayashi et al. | 320/136 |
| 7,408,325 | B2 * | 8/2008 | Yamamoto et al. | 320/133 |
| 2005/0127873 | A1 | 6/2005 | Yamamoto et al. | |
| 2008/0094029 | A1 * | 4/2008 | Singh | 320/118 |

FOREIGN PATENT DOCUMENTS

| JP | 10-050352 | 2/1998 |
|---|---|---|
| JP | 10-271699 | 10/1998 |
| JP | 11-150877 | 6/1999 |
| JP | 2000-106220 | 4/2000 |
| JP | 3229696 | 11/2001 |
| JP | 3633412 | 3/2005 |
| JP | 2005-176520 | 6/2005 |

* cited by examiner

*Primary Examiner* — Huy Q Phan
*Assistant Examiner* — Alesa Allgood
(74) *Attorney, Agent, or Firm* — McDermott Will & Emery LLP

(57) ABSTRACT

A set battery control circuit includes: a voltage detection portion that detects a terminal voltage across each secondary battery in a set battery formed by connecting a plurality of secondary batteries in series; a discharge portion that discharges the plurality of secondary batteries; and an imbalance reduction processing portion that performs imbalance reduction processing at set timing preset as timing at which terminal voltages across the plurality of secondary batteries become voltages at or below a cut-off voltage of discharge preset as a voltage at which discharge is to end in such a manner that a secondary battery having a terminal voltage higher than a lowest voltage, which is a lowest terminal voltage among the terminal voltages across the plurality of secondary batteries detected by the voltage detection portion, is discharged by means of the discharge portion so that a difference among the terminal voltages across the respective secondary batteries is lessened.

10 Claims, 7 Drawing Sheets

PRIOR ART
FIG. 6

SET BATTERY CONTROL METHOD AND SET BATTERY CONTROL CIRCUIT AS WELL AS CHARGING CIRCUIT AND BATTERY PACK HAVING THE SET BATTERY CONTROL CIRCUIT

RELATED APPLICATIONS

This application is the U.S. National Phase under 35 U.S.C. §371 of International Application No. PCT/JP2007/073915, filed on Dec. 12, 2007, which in turn claims the benefit of Japanese Application No. 2006-337182, filed on Dec. 14, 2006, the disclosures of which Applications are incorporated by reference herein.

TECHNICAL FIELD

The present invention relates to a set battery control method and a set battery control circuit configured to reduce an imbalance in a set battery formed by connecting a plurality of secondary batteries in series as well as a charging circuit and a battery pack having the set battery control circuit.

BACKGROUND ART

Figure 6:
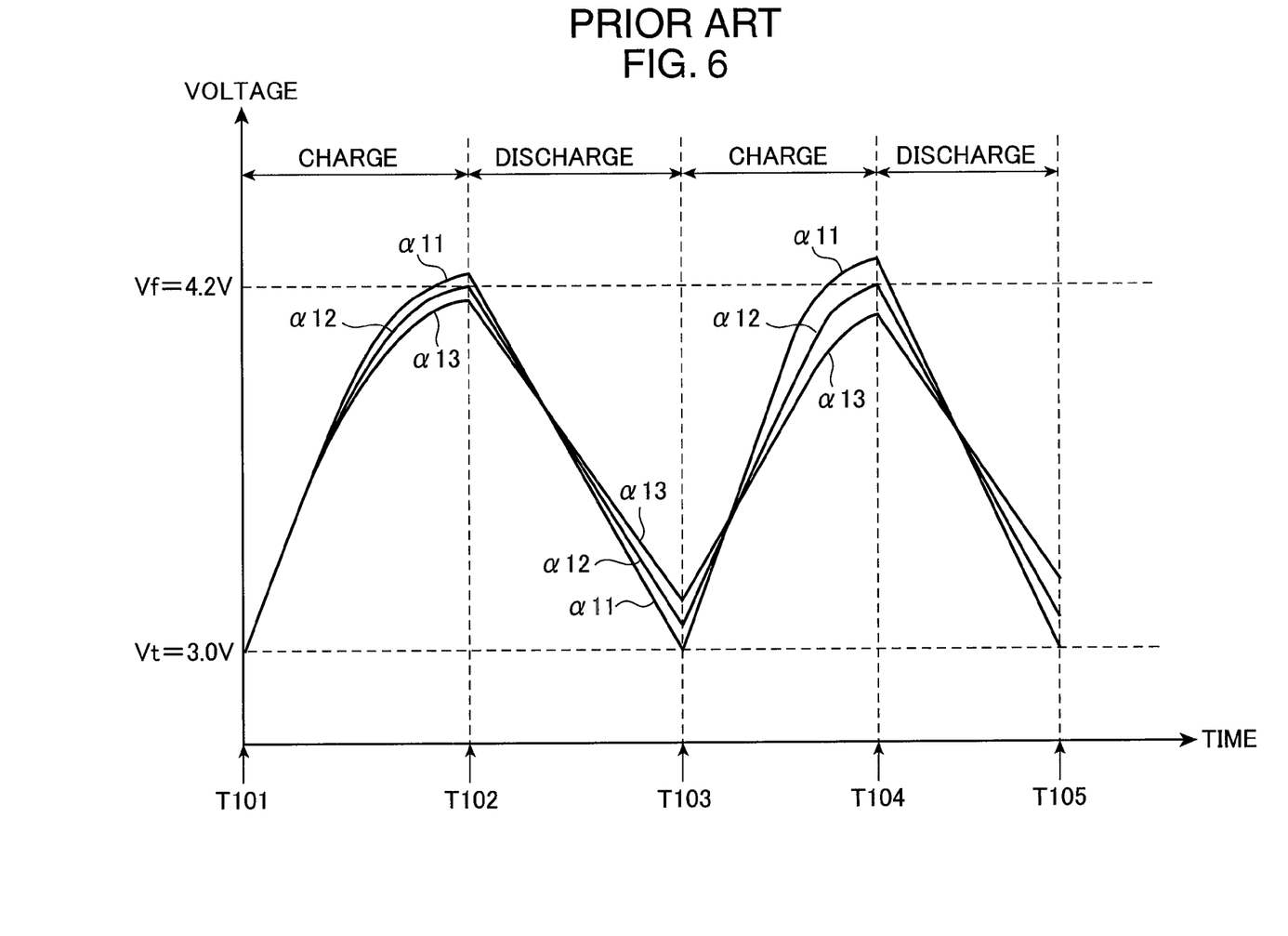
FIG. 6 is a view used to describe a charge method according to the background art.

FIG. 6 shows a case where a set battery formed by connecting a plurality of secondary batteries in series is charged and discharged by a charge and discharge method for a secondary battery in the background art, and it is a graph showing, for example, changes of terminal voltages $\alpha 11$, $\alpha 12$, and $\alpha 13$ across three secondary batteries 111, 112, and 113, respectively.

Initially, at timing T101, the terminal voltages $\alpha 11$, $\alpha 12$, and $\alpha 13$ across the secondary batteries 111, 112, and 113, respectively, are all equal at a cut-off voltage of discharge, Vt (for example, 3.0 V) and the secondary batteries 111, 112, and 113 are in a balanced state. When a charge current is flown to charge the set battery, the terminal voltages $\alpha 11$, $\alpha 12$, and $\alpha 13$ gradually increase.

A secondary battery deteriorates when it is charged to the extent that the terminal voltage exceeds a predetermined cut-off voltage of charge, Vf. Accordingly, it is set in such a manner that in a case where the set battery as described above is charged, the voltage across the set battery takes a value found by: cut-off voltage of charge, Vf× the number of secondary batteries in series. The cut-off voltage of charge, Vf, is typically 4.2 V in a case where the secondary batteries are, for example, lithium-ion batteries. Hence, in the case of a set battery formed by connecting three secondary batteries 111, 112, and 113 in series, the set battery is charged until the voltage across the set battery reaches 4.2 V×3=12.6 V.

Incidentally, the internal resistance of a secondary battery increases when it deteriorates. Accordingly, when a charge voltage is applied across a series circuit formed by connecting a plurality of secondary batteries 111, 112, and 113 in series, the terminal voltage across a secondary battery having larger internal resistance, that is, a deteriorated secondary battery, becomes larger than those of the other intact batteries. When this happens, a charge voltage is no longer distributed equally to the respective secondary batteries. For example, assume that the secondary batteries 111, 112, and 113 are deteriorated more in this order, the terminal voltage $\alpha 11$ across the most deteriorated secondary battery 111 becomes the highest and the terminal voltage $\alpha 13$ across the least deteriorated secondary battery 113 becomes the lowest.

Then, at timing T102 in FIG. 6 when the charge ends, the terminal voltages $\alpha 11$, $\alpha 12$, and $\alpha 13$ across the secondary batteries 111, 112, and 113, respectively, are all different voltages, which gives rise to an imbalance among the secondary batteries 111, 112, and 113. By discharging the set battery that has been charged in the occurrence of an imbalance as described above by connecting a load to the set battery, then the terminal voltages across the secondary batteries drop faster in ascending order of deterioration.

In a case where a secondary battery is discharged, the secondary battery deteriorates when it is overdischarged. Accordingly, a voltage about at which the secondary battery will not be deteriorated is set as the cut-off voltage of discharge, Vt, which is the voltage at which discharge is to end. For example, in the case of a lithium-ion battery, the cut-off voltage of discharge, Vt, is typically set to a voltage of about 3.0 V. It is configured in such a manner that the discharge ends when the lowest voltage among the terminal voltages $\alpha 11$, $\alpha 12$, and $\alpha 13$ has dropped to the cut-off voltage of discharge, Vt=3.0 V (timing T103).

Consequently, at the timing T103, the terminal voltage $\alpha 11$ across the most deteriorated secondary battery 111 becomes the lowest and the terminal voltage $\alpha 13$ across the least deteriorated secondary battery 113 becomes the highest. An imbalance among the terminal voltages $\alpha 11$, $\alpha 12$, and $\alpha 13$ is therefore increased.

In addition, the terminal voltage $\alpha 11$ across the most deteriorated secondary battery 111 will have dropped to the cut-off voltage of discharge, Vt, before the terminal voltages $\alpha 12$ and $\alpha 13$ across the less deteriorated secondary batteries 112 and 113, respectively, drop to the cut-off voltage of discharge, Vt. The discharge is therefore ended and feeding of a current to the load is stopped. This causes an inconvenience that the capacities of the less deteriorated secondary batteries 112 and 113 are not utilized effectively and the capacity of the overall set battery is reduced.

While charge and discharge operations as above are repeated, as are indicated at timings T104 and T105, the secondary battery 111 more deteriorated than the other secondary batteries deteriorates further. This causes an inconvenience that a difference among the terminal voltages $\alpha 11$, $\alpha 12$, and $\alpha 13$ becomes larger.

Under these circumstances, there is a technique of reducing an imbalance among the secondary batteries forming the set battery by lessening a difference among the terminal voltages across a plurality of secondary batteries by forcedly discharging a secondary battery having the terminal voltage exceeding the cut-off voltage of charge, Vf, when the charge ends so as to lower the terminal voltage (for example, Patent Document 1).

Figure 7:
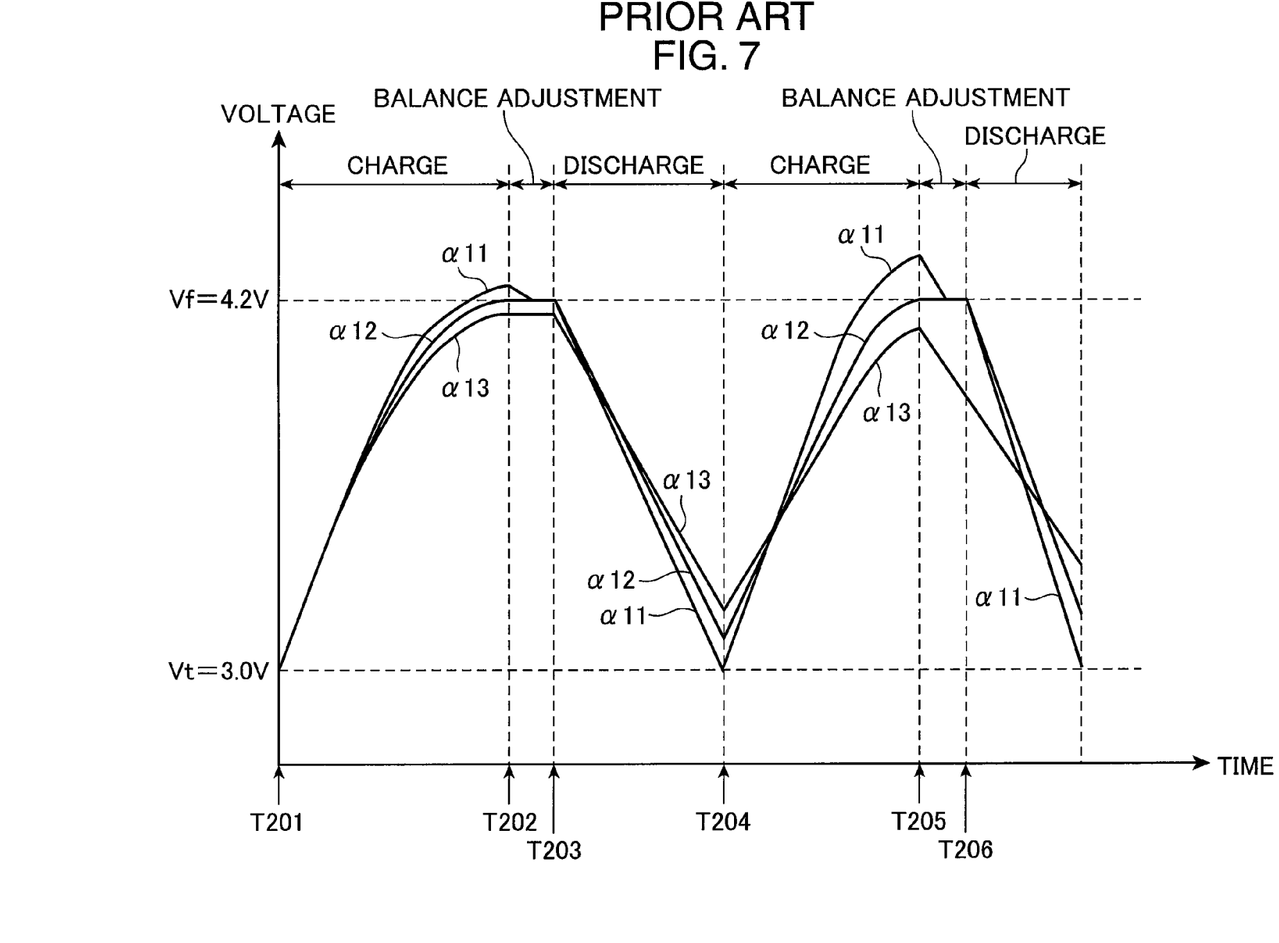
FIG. 7 is a view used to describe a charge method according to the background art.

FIG. 7 is a graph showing changes of the terminal voltages $\alpha 11$, $\alpha 12$, and $\alpha 13$ in a case where a difference among the terminal voltages across a plurality of the secondary batteries is lessened by forcedly discharging a secondary battery having the terminal voltage exceeding the cut-off voltage of charge, Vf, when the charge ends so as to lower the terminal voltage.

As is shown in FIG. 7, when the charge ends (timing T202), the secondary battery 111 having the terminal voltage exceeding the cut-off voltage of charge, Vf, is forcedly discharged for balance adjustment so as to lower the terminal voltage $\alpha 11$, a difference among the terminal voltages $\alpha 11$, $\alpha 12$, and $\alpha 13$ across the secondary batteries 111, 112, and 113, respectively, is lessened (timing T203).

According to the technique described in Patent Document 1, however, the most deteriorated secondary battery 111 is forcedly discharged further and the less deteriorated secondary batteries are not discharged. Hence, the chances of being discharged are increased more for the most deteriorated secondary battery 111 than for the less deteriorated secondary batteries, and the most deteriorated secondary battery is further deteriorated. This causes an inconvenience that deterioration varies considerably among the secondary batteries 111, 112, and 113 and an imbalance is increased.

In addition, as a secondary battery deteriorates further, the capacity decreases and the terminal voltage drops faster at the time of discharge. Then, according to the technique of Patent Document 1, because the secondary battery 111 that is considerably deteriorated and thereby has a reduced capacity is forcedly discharged further after the charge ends, an amount of electricity charged in the secondary battery 111 is reduced further. Hence, when the terminal voltage $\alpha 11$ across the most deteriorated secondary battery 111 has dropped to the cut-off voltage of discharge, Vt, due to discharge by use (timing T204), the terminal voltages $\alpha 12$ and $\alpha 13$ across the other secondary batteries 112 and 113, respectively, rather become higher than in a case where discharge is not forcedly performed for balance adjustment. This causes an inconvenience that there is a possibility that a difference among the terminal voltages $\alpha 11$, $\alpha 12$, and $\alpha 13$ across the secondary batteries 111, 112, and 113, respectively, is increased and so is an imbalance.

Patent Document 1: JP-A-2005-176520

DISCLOSURE OF THE INVENTION

An object of the invention is to provide a set battery control method and a set battery control circuit capable of lessening a difference among the terminal voltages across the respective secondary batteries while reducing the possibility that the most deteriorated secondary battery is deteriorated further as well as a charging circuit and a battery pack having the set battery control circuit.

A set battery control circuit according to one aspect of the invention includes: a voltage detection portion that detects a terminal voltage across each secondary battery in a set battery formed by connecting a plurality of secondary batteries in series; a discharge portion that discharges the plurality of secondary batteries; and an imbalance reduction processing portion that performs imbalance reduction processing at set timing preset as timing at which terminal voltages across the plurality of secondary batteries become voltages at or below a cut-off voltage of discharge preset as a voltage at which discharge is to end in such a manner that a secondary battery having a terminal voltage higher than a lowest voltage, which is a lowest terminal voltage among the terminal voltages across the plurality of secondary batteries detected by the voltage detection portion, is discharged by means of the discharge portion so that a difference among the terminal voltages across the respective secondary batteries is lessened.

Also, a set battery control method according to still another aspect of the invention includes: a voltage detecting step of detecting each of terminal voltages across a plurality of secondary batteries in a set battery formed by connecting the plurality of secondary batteries in series; and an imbalance reduction processing step of discharging a secondary battery having a terminal voltage higher than a lowest voltage, which is a lowest terminal voltage among the terminal voltages across the plurality of secondary batteries detected in the voltage detecting step, until the terminal voltage across the secondary battery drops to the lowest voltage at set timing preset as timing at which terminal voltages across the plurality of secondary batteries become voltages at or below a cut-off voltage of discharge preset as a voltage at which discharge is to end.

According to the set battery control circuit and the set battery control method configured as above, when a set battery formed by connecting a plurality of secondary batteries in series is discharged to a state where at least one of the terminal voltages across the plurality of secondary batteries becomes a voltage at or below the cut-off voltage of discharge preset as the voltage at which the discharge is to end, the terminal voltage in the set battery becomes lower for the secondary battery that is deteriorated more. Accordingly, at the set timing at which the terminal voltage becomes a voltage at or below the cut-off voltage of discharge, it is thought that the secondary battery having the lowest terminal voltage is deteriorated most.

Hence, by discharging a secondary battery having the terminal voltage higher than the lowest voltage, that is, a secondary battery thought to be less deteriorated than the secondary battery having the lowest terminal voltage, so as to lessen a difference among the terminal voltages across the respective secondary batteries, it becomes possible to lessen a difference among the terminal voltages across the respective secondary batteries while reducing the possibility that the most deteriorated secondary battery is discharged more and deteriorated further.

A charging circuit according to another aspect of the invention includes: the set battery control circuit described above; a charge portion that charges the set battery; and a detection portion that detects timing at which a user makes an operation to charge the set battery using the charge portion as the set timing. The imbalance reduction processing portion performs the imbalance reduction processing when the detection portion detects the set timing. The charge portion charges the set battery after the imbalance reduction processing is performed by the imbalance reduction processing portion.

According to the charging circuit configured as above, when the user makes an operation to charge the set battery using the charge portion, that is, when it is highly likely that at least one of the terminal voltages across the plurality of secondary batteries has dropped to or below the cut-off voltage of discharge, the set battery is charged after the imbalance reduction processing is performed. It thus becomes possible to lessen a difference among the terminal voltages across the respective secondary batteries while reducing the possibility that the most deteriorated secondary battery is discharged more and deteriorated further. In addition, by charging the set battery in a state where a difference among the terminal voltages across the respective secondary batteries is lessened, it becomes possible to reduce a cumulative increase of an imbalance among the secondary batteries.

Also, a battery pack according to still another aspect of the invention includes the set battery control circuit described above and the set battery.

According to the battery pack configured as above, because the imbalance reduction processing can be performed in the battery pack, it becomes possible to lessen a difference among the terminal voltages across the respective secondary batteries while reducing the possibility that the most deteriorated secondary battery is discharged more and deteriorated further in the battery pack.

Also, a battery pack according to still another aspect of the invention is a battery pack connected to a charge device that outputs a charge current to a secondary battery according to a command from an outside and includes: the set battery control circuit described above; the set battery; and a detection portion that detects timing at which a user makes an operation to charge the set battery using the charge portion as the set timing. The imbalance reduction processing portion outputs the command to output the charge current to the charge device after the imbalance reduction processing is performed upon detection of the set timing by the detection portion.

According to the battery pack configured as above, when the user makes an operation to charge the set battery using the charge portion, that is, when the terminal voltage across the most deteriorated secondary battery is thought to be the lowest voltage, the set battery can be charged by the charge device after a difference among the terminal voltages across the respective batteries is lessened by performing the imbalance reduction processing. It thus becomes possible to reduce a cumulative increase of an imbalance among the secondary batteries by charging the set battery using the charge device in a state where a difference among the terminal voltages across the respective secondary batteries is lessened while reducing the possibility that the most deteriorated secondary battery is discharged more and deteriorated further.

BEST MODE FOR CARRYING OUT THE INVENTION

Hereinafter, embodiments of the invention will be described with reference to the drawings. Components labeled with the same reference numerals in the respective drawings are the same components and descriptions thereof are omitted.

First Embodiment

Figure 1:
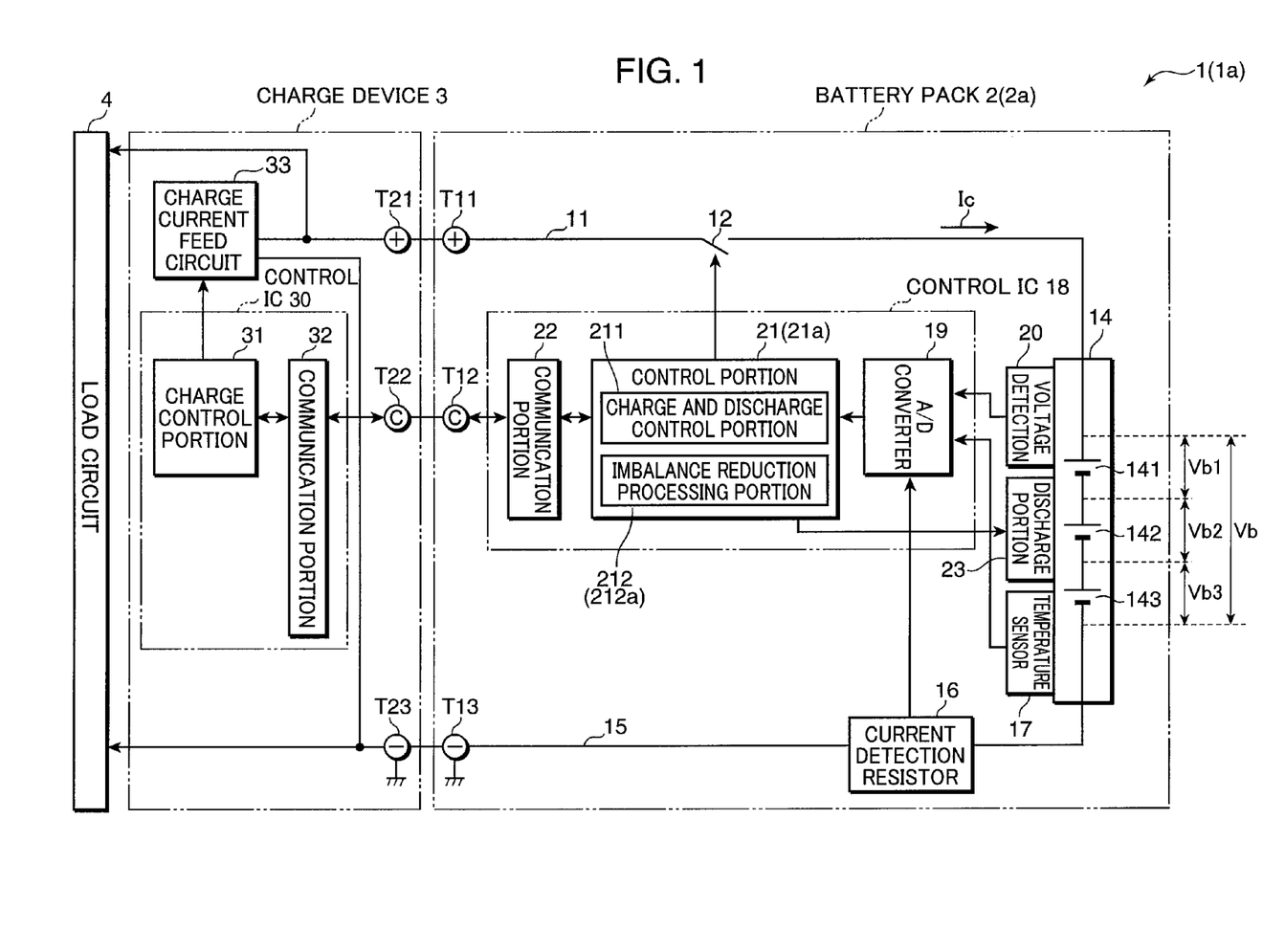
FIG. 1 is a block diagram showing an example of the configuration of a charge system using a battery pack having a set battery control circuit according to one embodiment of the invention.

FIG. 1 is a block diagram showing an example of the configuration of a charge system 1 using a battery pack 2 having a set battery control circuit according to one embodiment of the invention. The charge system 1 includes the battery pack 2 and a charge device 3 that charges the battery pack 2. However, the battery pack 2 and the charge device 3 are not necessarily separated from each other and it may be configured in such a manner that, as is shown in FIG. 1, the battery pack 2 and the charge device 3 are formed integrally into one circuit. Alternatively, it may be formed as an electric equipment system by further including a load circuit 4 to which power is fed from the battery pack 2. The battery pack 2 is charged by the charge device 3 in FIG. 1. However, the battery pack 2 may be attached to the load circuit 4, so that it is charged via the load circuit 4. The battery pack 2 and the charge device 3 are connected to each other by terminals T11 and T21 on the DC (Direct Current) high side for power feeding, terminals T12 and T22 for a communication signal, and GND terminals T13 and T23 for power feeding and a communication signal. Similar terminals are provided also in a case where the battery pack 2 is attached to the load circuit 4.

The terminals T21 and T23 of the charge device 3 are connected to the load circuit 4 and a current fed from a set battery 14 is fed to the load circuit 4 via a switching element 12, a charge path 11, and the terminals T11 and T21. The load circuit 4 is a load circuit in an electric device driven on power fed from the battery pack 2. For example, when the power supply switch of an unillustrated electric device is turned ON, a drive current of the load circuit 4 is fed to the load circuit 4 from the battery pack 2.

The battery pack 2 includes the switching element 12, the set battery 14, a current detection resistor 16, a temperature sensor 17, a control IC (Integrated Circuit) 18, a voltage detection circuit 20 (voltage detection portion), a discharge portion 23, and the terminals T11, T12, and T13. As the switching element 12, a semiconductor switching element, such as an FET (Field Effect Transistor), and a switching element, such as a relay switch, are available. The control IC 18 includes an A/D (analog-to-digital) converter 19, a control portion 21, and a communication portion 22.

The switching element 12 is provided inside the battery pack 2 in the charge path 11 on the DC high side extending from the terminal T11. The other end of the charge path 11 is connected to the high-side terminal of the set battery 14. The low-side terminal of the set battery 14 is connected to the GND terminal T13 via a charge path 15 on the DC low side. The current detection resistor 16 that converts a charge current and a discharge current to a voltage value is provided in the charge path 15.

The set battery 14 includes a plurality of secondary batteries 141, 142, and 143 connected in series. The temperature of each secondary battery is detected by the temperature sensor 17 and inputted into the A/D converter 19 in the control IC 18. As the secondary batteries 141, 142, and 143, for example, lithium-ion secondary batteries are available. It should be appreciated, however, that the secondary batteries 141, 142, and 143 are not necessarily separate units of secondary batteries and they may be, for example, a plurality of secondary batteries connected in parallel.

The terminal voltages Vb1, Vb2, and Vb3 across a plurality of the secondary batteries 141, 142, and 143, respectively, are detected by the voltage detection circuit 20 and inputted into the A/D converter 19 in the control IC 18. Further, the current value detected by the current detection resistor 16 is also inputted into the A/D converter 19 in the control circuit IC 18. The A/D converter 19 converts the respective values inputted therein to digital values, which are outputted to the control portion 21.

In addition, the discharge portion 23 that selectively discharges the respective secondary batteries 141, 142, and 143 is connected to the set battery 14.

Figure 2:
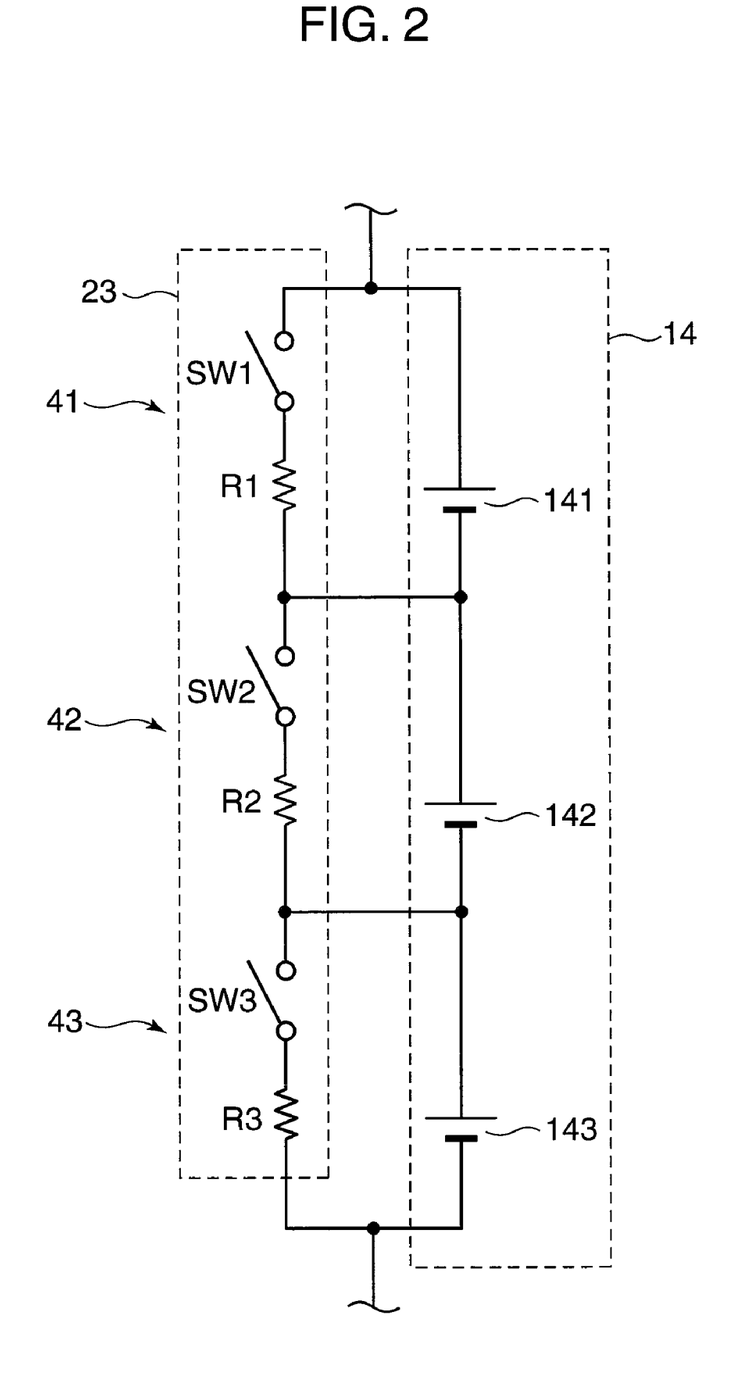
FIG. 2 is a circuit diagram showing an example of the detailed configuration of a set battery and a discharge portion shown in FIG. 1.

FIG. 2 is a circuit diagram showing an example of the detailed configuration of the set battery 14 and the discharge portion 23. The discharge portion 23 shown in FIG. 2 includes switching elements SW1, SW2, and SW3 and resistors R1, R2, and R3. A series circuit of the switching element SW1 and the resistor R1 is connected to the secondary battery 141 in parallel. A series circuit of the switching element SW2 and the resistor R2 is connected to the secondary battery 142 in parallel. A series circuit of the switching element SW3 and the resistor R3 is connected to the secondary battery 143 in parallel. As the switching elements SW1, SW2, and SW3, semiconductor switching elements, such as an FET, and various switching elements, such as a relay switch, are available.

The switching elements SW1, SW2, and SW3 come ON or go OFF according to a control signal from the control portion 21. When the switching element SW1 comes ON, the secondary battery 141 is discharged via the resistor R1. When the switching element SW2 comes ON, the secondary battery 142 is discharged via the resistor R2. When the switching element SW3 comes ON, the secondary battery 143 is discharged via the resistor R3.

The control portion 21 includes a CPU (Central Processing Unit) that performs, for example, predetermined arithmetic processing, a ROM (Read Only Memory) in which a predetermined control program is pre-stored, a RAM (Random Access Memory) in which data is stored temporarily, and peripheral circuits. The control portion 21 functions as a charge and discharge control portion 211 and an imbalance reduction processing portion 212 by running the control program pre-stored in the ROM.

In this case, the voltage detection circuit 20, the discharge circuit 23, and the imbalance reduction processing portion 212 correspond to an example of the set battery control circuit in appended claims.

The imbalance reduction processing portion 212 performs imbalance reduction processing when at least one of the terminal voltages across the secondary batteries 141, 142, and 143 has dropped to or below the cut-off voltage of discharge, Vt, as a current is fed from the set battery 14 to the load circuit 4, so that a secondary battery having the terminal voltage higher than the lowest voltage among the terminal voltages Vb1, Vb2, and Vb3 across the secondary batteries 141, 142, and 143, respectively, detected by the voltage detection circuit 20 is discharged by the discharge portion 23 until the terminal voltage across this secondary battery drops to the lowest voltage.

The charge and discharge control portion 211 calculates a voltage value and a current value of a charge current that specify the power to the charge device 3 in response to various values inputted therein from the A/D converter 19 and transmits the computation result to the charge device 3 from the communication portion 22 via the terminals T12 and T22 and the terminals T21 and T23. The set battery 14 is thus charged by the charge device 3.

The charge and discharge control portion 211 also performs a protection operation to turn OFF the switching element 12 in response to an abnormality on the outside of the battery pack 2, such as a short circuit between the terminals T11 and T13 and an abnormal current from the charge device 3, and an abnormal temperature rise of the set battery 14 on the basis of the various values inputted therein from the A/D converter 19.

The charge device 3 receives a command from the charge and discharge control portion 211 at the communication portion 32 serving as communication means in the control IC 30 and feeds a charge current at the voltage value and the current value described above and a pulse width by controlling a charge current feed circuit 33 (charge portion) by means of the charge control portion 31.

The charge current feed circuit 33 is formed of an AC-to-DC converter or a DC-to-DC converter. The charge current feed circuit 33 converts an input voltage to a voltage value, a current value, and a pulse width specified by the charge control portion 31 and supplies the conversion result to the charge paths 11 and 15 via the terminals T21 and T11 and the terminals T23 and T13, respectively.

It should be appreciated that the invention is not limited to a case where the control portion 21 is provided to the battery pack 2, and the control portion 21 may be provided to the charge device 3. Alternatively, the control portion 21 may be allocated to both the battery pack 2 and the charge device 3.

Figure 3:
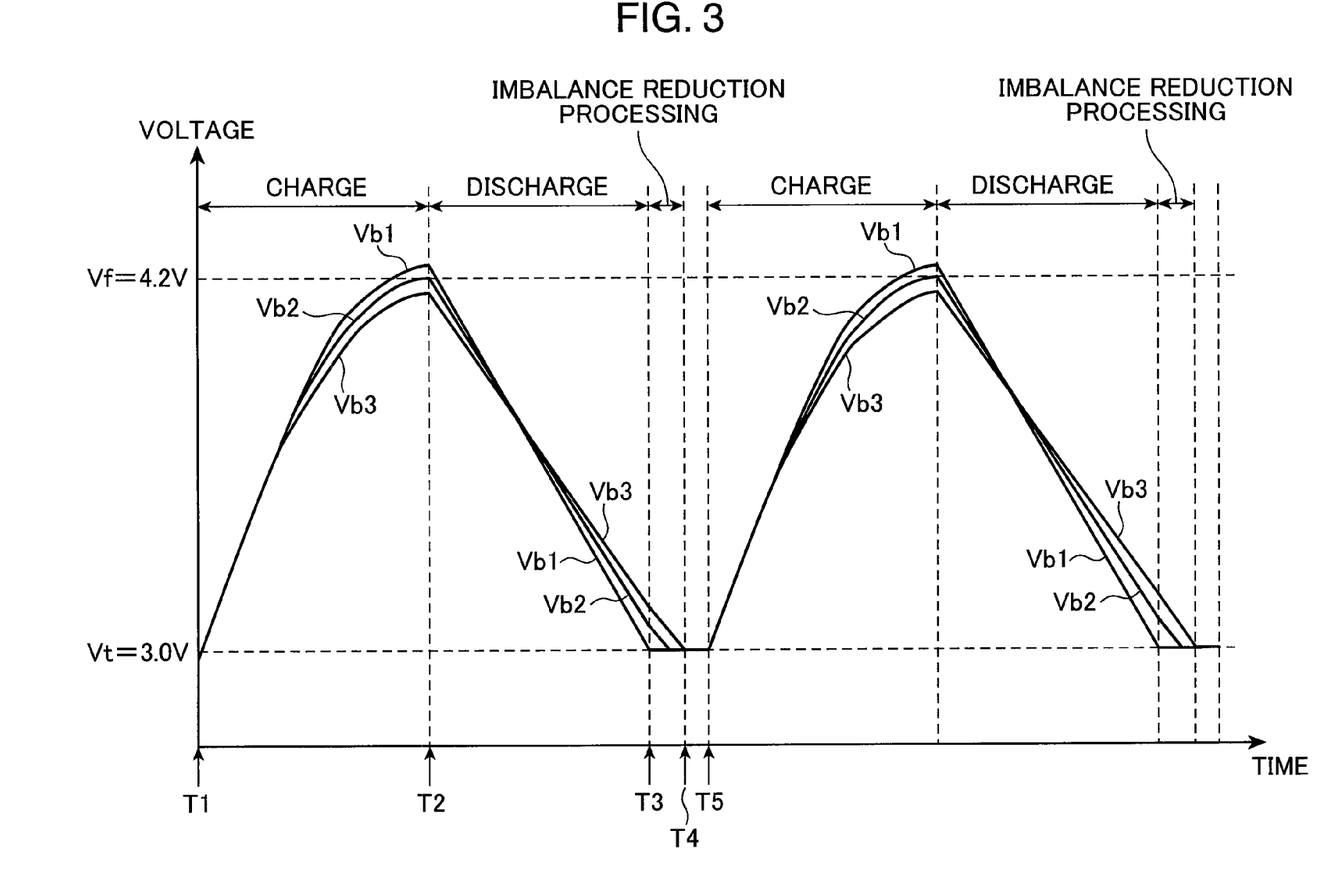
FIG. 3 is a view used to describe an example of an operation of a charge system according to a first embodiment.

An operation of the charge system 1 using the battery pack 2 configured as above will now be described. FIG. 3 is a view used to describe one example of an operation of the charge system 1 shown in FIG. 1. Initially, for example, in a case where the battery pack 2 is connected to the charge device 3, when the switching element 12 is turned ON by the charge and discharge control portion 211, a command to start charge at predetermined current and voltage is transmitted from the charge and discharge control portion 211 to the charge control portion 31 via the communication portion 22, the terminals T12 and T22, and the communication portion 32. Charge is thus started (timing T1).

Accordingly, in response to a control signal from the charge control portion 31, a charge current is fed from the charge current feed circuit 33 to the set battery 14 via the terminals T21 and T11, the charge path 11, and the switching element 12 at the current and voltage according to the command from charge and discharge control portion 211. The terminal voltages Vb1, Vb2, and Vb3 increase while the secondary batteries 141, 142, and 143 are charged.

At the timing T1, the terminal voltages Vb1, Vb2, and Vb3 are all equal at the cut-off voltage of discharge, Vt (for example, 3.0 V). The secondary batteries 141, 142, and 143 are therefore in a balanced state.

When the secondary batteries 141, 142, and 143 are charged, a difference is generated among the terminal voltages Vb1, Vb2, and Vb3 according to the degree of deterioration in the secondary batteries 141, 142, and 143. To be more concrete, the internal resistance becomes larger and the terminal voltage increases significantly for the secondary battery that is deteriorated more. For example, assume that secondary batteries 141, 142, and 143 are deteriorated more in this order, then the terminal voltage Vb1 across the most deteriorated secondary battery 141 becomes the highest voltage and the terminal voltage Vb3 across the least deteriorated secondary battery 143 becomes the lowest voltage.

FIG. 3 shows changes of the terminal voltages Vb1, Vb2, and Vb3 in the case of CC (Constant Current) charge to feed a constant current to the set battery 14 by way of example. The invention, however, is not limited to a particular charge method and it is possible to adopt various charge methods, such as CV (Constant Voltage) charge to perform charge at a constant voltage, CCCV (Constant Charge Constant Voltage) charge to switch from CC (Constant Current) charge to CV (Constant Voltage) charge, pulse charge to feed a pulse-wise charge current, and trickle charge to perform charge using a minute current. Alternatively, it may be configured in such a manner that the set battery 14 is charged while a load current is fed to the load circuit 4.

For example, when the terminal voltage Vb across the set battery 14 detected by the voltage detection circuit 20 and obtained by the A/D converter 19 reaches a voltage found by multiplying the cut-off voltage of charge, Vf, by the number of secondary batteries in series, for example, 4.2 V×3=12.6 V, a command to stop feeding the charge current is transmitted by the charge and discharge control portion 211 to the charge control portion 31 via the communication portion 22, the terminals T12 and T22, and the communication portion 32. An output current of the charge current feed circuit 33 is thus reduced to 0 by the charge control circuit 31. The charge is thus ended (timing T2).

It should be appreciated that the invention is not limited to a case where the charge is ended when the terminal voltage Vb across the set voltage 14 reaches the voltage found by multiplying the cut-off voltage of charge, Vf, by the number of secondary batteries in series (for example, 4.2 V×3=12.6 V). It may be configured in such a manner that deterioration of the secondary batteries 141, 142, and 143 is reduced by ending the charge when the maximum voltage among the terminal voltages Vb1, Vb2, and Vb3 reaches the cut-off voltage of charge, Vf (for example, 4.2 V).

At the timing T2, the terminal voltages across the secondary batteries 141, 142, and 143 becomes higher in ascending order of deterioration. For example, the voltages become higher in order of the terminal voltages Vb1, Vb2, and Vb3.

For example, when the unillustrated power supply switch of the load circuit 4 is turned ON, a current fed from the set battery 14 is fed to the load circuit 4 via the switching element 12, the charge path 11, and the terminals T11 and T21. The set battery 14, that is, the secondary batteries 141, 142, and 143 are thus discharged. The terminal voltages Vb1, Vb2, and Vb3 then start to drop gradually in response to the discharge of the secondary batteries 141, 142, and 143.

In the process in which the secondary batteries 141, 142, and 143 are discharged, a voltage drops faster in ascending order of deterioration of the secondary batteries. Hence, at the start of discharge, that is, in a state where the set battery 14 is fully charged, the voltages are higher in order of the terminal voltages Vb1, Vb2, and Vb3. However, when the set battery 14 is discharged to some extent, the order of voltages is inverted and the terminal voltages across the secondary batteries become lower in ascending order of deterioration. The voltages therefore become higher in order of the terminal voltages Vb3, Vb2, and Vb1.

When the terminal voltage Vb1, which is the lowest voltage among the terminal voltages Vb3, Vb2, and Vb1 obtained by the A/D converter 19, has dropped to the cut-off voltage of discharge, Vt, the switching element 12 is turned OFF by the charge and discharge control portion 211 to stop the discharge in order to prevent overdischarge of the set battery 14 (timing T3). Further, the switching elements SW2 and SW3 of the discharge portion 23 are turned ON by the imbalance reduction processing portion 212 to discharge the secondary batteries 142 and 143 having the terminal voltages higher than the terminal voltage Vb1. The imbalance reduction processing is thus started.

The invention is not limited to a case where the imbalance reduction processing is started when the terminal voltage Vb1, which is the lowest voltage among the terminal voltages Vb3, Vb2, and Vb1, has dropped to the cut-off voltage of discharge, Vt. For example, it may be configured in such a manner that the imbalance reduction processing is performed when the terminal voltage Vb across the set battery 14 has dropped to or below a value found by multiplying the cut-off voltage of discharge, Vt, by the number of secondary batteries in series.

Figure 4:
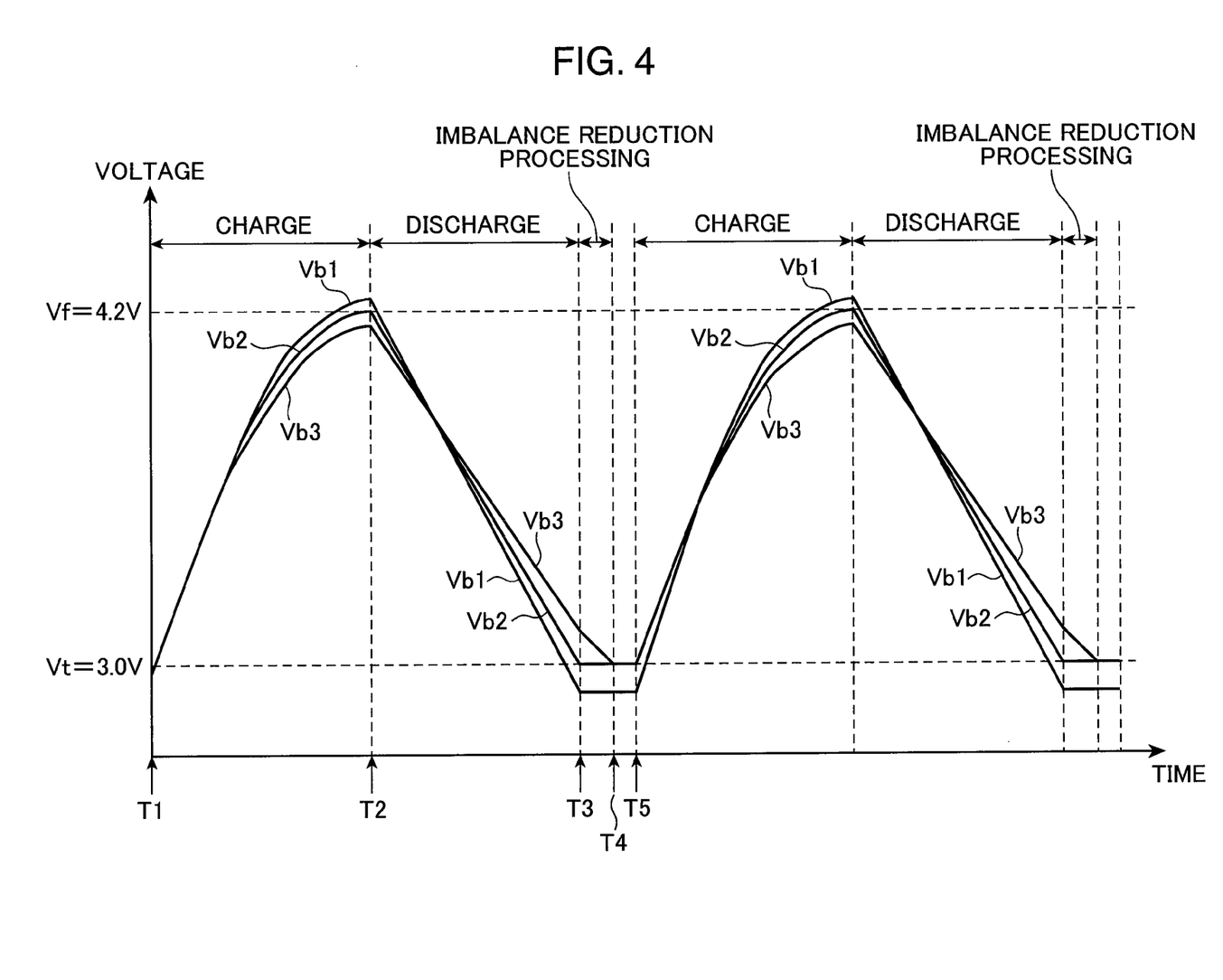
FIG. 4 is a view used to describe an example of an operation of the charge system according to the first embodiment.

In this case, as is shown in FIG. 4, the imbalance reduction processing is performed when the average value of the terminal voltages Vb1, Vb2, and Vb3 has dropped to the cut-off voltage of discharge, Vt. Then, one of the terminal voltages Vb1, Vb2, and Vb3 may possibly drop below the cut-off voltage of discharge, Vt. However, it is possible to decrease deterioration caused by overdischarge by discharging only the secondary batteries having the terminal voltage higher than the cut-off voltage of discharge, Vt, by the discharge portion 23 until the terminal voltage drops to the cut-off voltage of discharge, Vt.

When the terminal voltages Vb2 and Vb3 across the secondary batteries 142 and 143, respectively, almost coincide with the terminal voltage Vb1, the switching elements SW2 and SW3 are turned OFF by the imbalance reduction processing portion 212 so as to stop the discharge by the discharge portion 23. The imbalance reduction processing is thus ended (timing T4).

As has been described, the terminal voltages Vb1, Vb2, and Vb3 are made almost equal by the imbalance reduction processing by the imbalance reduction processing portion 212, and an imbalance among the secondary batteries 141, 142, and 143 is reduced. At the timing T3, the terminal voltages become higher for the secondary batteries that are deteriorated less. The imbalance reduction processing portion 212 is therefore able to lessen a difference among the terminal voltages across the respective secondary batteries by discharging the less deteriorated secondary batteries by discharging the secondary batteries having the higher terminal voltages at the timing T3.

Accordingly, in the battery pack 2 shown in FIG. 1, the most deteriorated secondary battery will not be deteriorated further by discharging the most deteriorated secondary battery as is in the case of the background art shown in FIG. 7, more specifically, as in a case where a difference among the terminal voltages across a plurality of secondary batteries is lessened by forcedly discharging the secondary battery having the terminal voltage exceeding the cut-off voltage of charge, Vf, when the charge ends so as to lower the terminal voltage. It thus becomes possible to lessen a difference among the terminal voltages across the respective secondary batteries while reducing the possibility that a considerably deteriorated secondary battery is deteriorated further.

Also, in the battery pack 2 shown in FIG. 1, the imbalance reduction processing is performed after the set battery 14 is discharged. Accordingly, when the set battery 14 is charged again (timing T5), the set battery 14 is in a state where a difference among the terminal voltages Vb1, Vb2, and Vb3 is lessened. It is therefore possible to reduce a cumulative increase a difference among the terminal voltages across the respective secondary batteries while the set battery is charged and discharged repetitively as in the background art shown in FIG. 6.

Also, the set battery control circuit formed using the voltage detection circuit 20, the discharge portion 23, and the imbalance reduction processing portion 212 as described above does not require a charging circuit in the set battery 14 and it can be formed on the battery pack 2 side alone. It thus becomes possible to lessen a difference among the terminal voltages across the respective secondary batteries in the set battery by including the set battery control circuit in the battery pack without having to change the charger.

The above described a case where the imbalance reduction processing portion 212 drops the terminal voltages Vb2 and Vb3 until they almost coincide with the terminal voltage Vb1, which is the lowest voltage. However, in a case where the lowest voltage is below the cut-off voltage of discharge, Vt, it may be configured in such a manner that only the secondary battery having the terminal voltage higher than the cut-off voltage of discharge, Vt, is discharged by the discharge portion 23 until the terminal voltage drops to the cut-off voltage of discharge, Vt. In this case, it becomes possible to reduce the possibility that the secondary battery having the terminal voltage below the cut-off voltage of discharge, Vt, from becoming an overdischarge state as it is discharged further by the discharge portion 23.

Second Embodiment

A charge system 1a using a charging circuit according to a second embodiment of the invention will now be described. As with the charge system 1, the charge system 1a is shown in FIG. 1. The charge system 1a is different from the charge system 1 in the timing at which the imbalance reduction processing is performed by an imbalance reduction processing portion 212a in a battery pack 2a. The charge device 3 corresponds to an example of the charge portion. The voltage detection circuit 20, the discharge portion 23, and the imbalance reduction processing portion 212a correspond to an example of the set battery control circuit. The charge and discharge control portion 211, the voltage detection circuit 20, the discharge portion 23, and the imbalance reduction processing portion 212a correspond to an example of the charging circuit.

As with the charge system 1, the charge system 1a may be formed of the battery pack 2a and the charge device 3 that are formed integrally into one circuit. Alternatively, it may be formed as an electric equipment system by further including a load circuit 4 to which power is fed from the battery pack 2a. Also, the battery pack 2a may be attached to the load circuit 4, so that it is charged via the load circuit 4. Further the control portion 21a may be provided to the charge device 3. Alternatively, the control portion 21a may be allocated to both the battery pack 2 and the charge device 3.

Because the other configurations and operations are the same as those of the charge system 1, the descriptions thereof are omitted herein and a characteristic point of the charge system 1a will be described in the following.

When the user makes an operation to charge the battery pack 2a, the imbalance reduction processing portion 212a starts the imbalance reduction processing upon detection of this operation. The set battery 14 is charged by outputting a command to output a charge current to the charge device 3 after the imbalance reduction processing is performed.

In this case, the operation by the user to charge the battery pack 2a is an operation by which user is to charge the battery pack 2a, for example, an operation by the user to attach the battery pack 2a to the charge device 3 or an operation by the user to insert an unillustrated power supply plug of the charge device 3 in a socket.

When such an operation is made, for example, a request to start charge is transmitted from the control IC 30 in the charge device 3 to the control portion 21a via the terminals T22 and T12 and the communication portion 22, or an unillustrated detection circuit detects that the charge device 3 and the battery pack 2a are connected to each other or it detects a charge voltage outputted from the charge device 3. Upon such detection, the imbalance reduction processing portion 212a detects that the user made an operation to charge the battery pack 2a and starts the imbalance reduction processing. In this case, the imbalance reduction processing portion 212a corresponds to an example of the detection portion.

Alternatively, for example, in a case where the user insets the unillustrated power supply plug of the charge device 3 in the outlet, it may be configured in such a manner that an operation power supply voltage for the control portion 21a is fed from an unillustrated power supply circuit so that the CPU in the control portion 21a starts to operate and functions as the imbalance reduction processing portion 212a, based on which an operation by the user to charge the battery pack 2a is detected. In this case, the control portion 21a corresponds to an example of the detection portion.

When the user attaches the battery pack 2a to the charge device 3 or when the user inserts the unillustrated power supply plug of the charge device 3 in the outlet, it is most likely that the user wishes to charge the set battery 14 because at least one of the terminal voltages across the secondary batteries 141, 142, and 143 has dropped to or below the cut-off voltage of discharge, Vt, and the set battery 14 is no longer able to feed power to the load circuit 4.

In other words, the timing at which it is detected that the user attaches the battery pack 2a to the charge device 3 or the user inserts the unillustrated power supply plug of the charge device 3 in the outlet corresponds to an example of the set timing at which at least one of the terminal voltages across a plurality of the secondary batteries 141, 142, and 143 becomes a voltage at or below the cut-off voltage of discharge, Vt, that is preset as the voltage at which the discharge is to end.

It may be configured in such a manner that the imbalance reduction processing portion 212a starts the imbalance reduction processing at the set timing which is set to a point when at least one of the terminal voltages Vb1, Vb2, and Vb3 has dropped to or below the cut-off voltage of discharge, Vt, on the basis of the terminal voltages Vb1, Vb2, and Vb3 obtained by the A/D converter 19.

Figure 5:
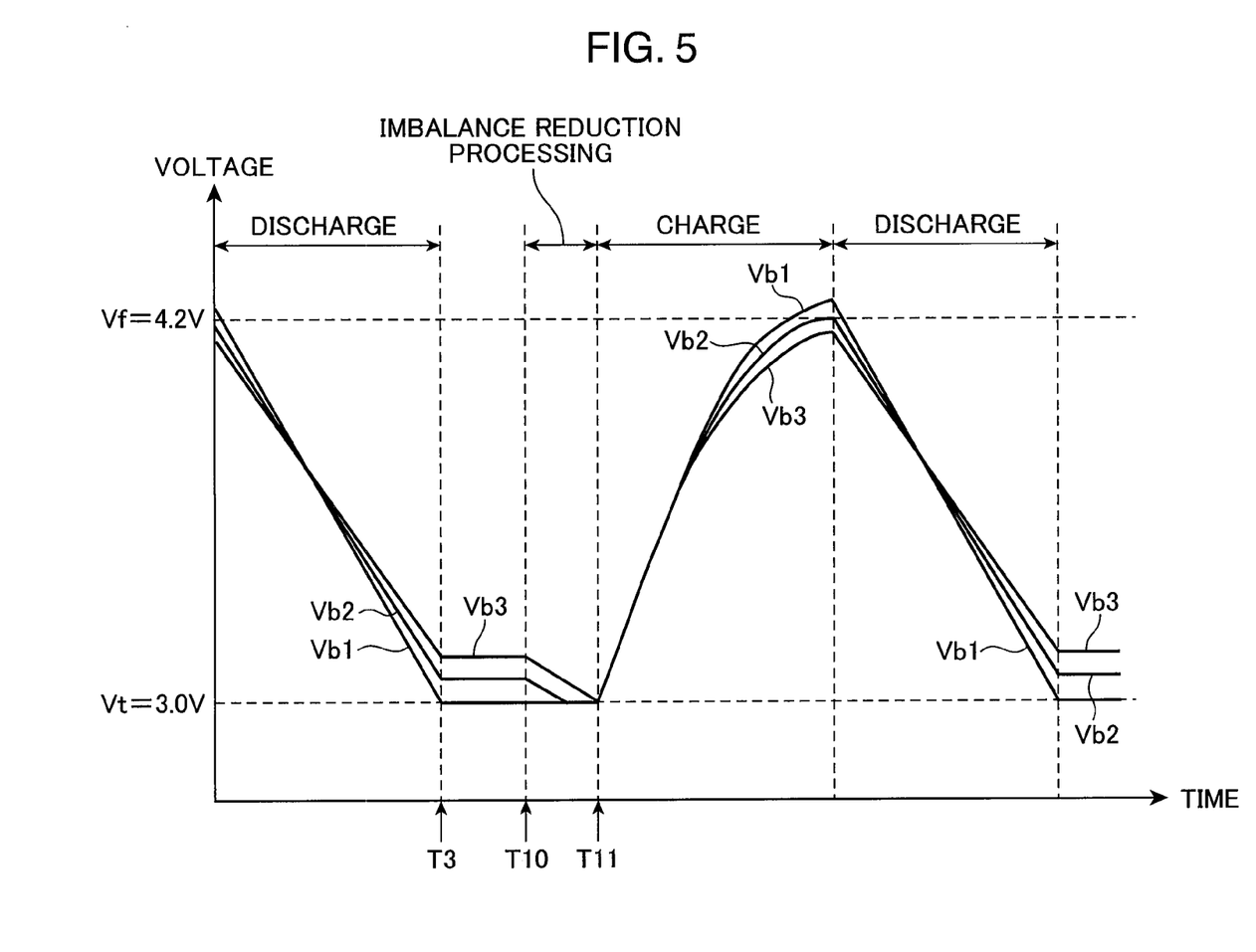
FIG. 5 is a view used to describe an example of an operation of a charge system according to a second embodiment.

An operation of the battery pack 1a using the battery pack 2a configured as described above will now be described. FIG. 5 is a view used to describe an example of an operation of the charge system 1a shown in FIG. 1. Initially, the charge and discharge operations same as those at the timing T1 through T3 in FIG. 3 are performed. At the timing T3, the terminal voltages become lower for the secondary batteries that are deteriorated more. The voltages therefore become higher in order of the terminal voltages Vb3, Vb2, and Vb1. This state is maintained intact because the feeding of a current from the set battery 14 to the load circuit 4 is stopped at the timing T3.

Subsequently, for example, when the user attaches the battery pack 2a to the charge device 3 or the user inserts the unillustrated power supply plug of the charge device 3 into the outlet, for example, a request to start charge is transmitted from the control IC 30 in the charge device 3 to the control portion 21a via the terminals T22 and T12 and the communication portion 22. The imbalance reduction processing portion 212a then turns ON the switching elements SW2 and SW3 of the discharge device 23 for discharging the secondary batteries 142 and 143 having the terminal voltages higher than the terminal voltage Vb1 (timing T10). The imbalance reduction processing is thus started.

When the terminal voltages Vb2 and Vb3 across the secondary batteries 142 and 143, respectively, almost coincide with the terminal voltage Vb1, the imbalance reduction processing portion 212a turns OFF the switching elements SW2 and SW3 so as to stop the discharge by the discharge portion 23. The imbalance reduction processing is thus ended. Further, a command to start charge at predetermined current and voltage is transmitted from the imbalance reduction processing portion 212a to the charge control portion 31 via the communication portion 22, the terminals T12 and T22, and the communication portion 32. The charge is thus started (timing T11).

Accordingly, in response to the control signal from the charge control portion 31, a charge current is fed from the charge current feed circuit 33 to the set battery 14 via the terminals T21 and T11, the charge path 11, and the switching element 12 at the current and voltage according to the command from the imbalance reduction processing portion 212a. The set battery 14 is thus charged.

As has been described, the terminal voltages Vb1, Vb2, and Vb3 are made almost equal by the imbalance reduction processing by the imbalance reduction processing portion 212a and an imbalance among the secondary batteries 141, 142, and 143 is reduced. Also, at the timing T10, the terminal voltages become higher for the secondary batteries that are deteriorated less. Hence, by discharging the less deteriorated secondary batteries by discharging the secondary batteries having the higher terminal voltages at the timing T10, the imbalance reduction processing portion 212a becomes able to lessen a difference among the terminal voltages across the respective secondary batteries.

Accordingly, in the battery pack 2a shown in FIG. 1, the most deteriorated secondary battery will not be deteriorated further by discharging the most deteriorated secondary battery as is in the case of the background art shown in FIG. 7, more specifically, as in a case where a difference among the terminal voltages across a plurality of secondary batteries is lessened by forcedly discharging the secondary battery having the terminal voltage exceeding the cut-off voltage of charge, Vf, when the charge ends so as to lower the terminal voltage. It thus becomes possible to lessen a difference among the terminal voltages across the respective secondary batteries while reducing the possibility that a considerably deteriorated secondary battery is deteriorated further.

Also, in the battery pack 2a shown in FIG. 1, the imbalance reduction processing is performed before the set battery 14 is charged. Accordingly, when the charge is started (timing T11), the set battery 14 is in a state where a difference among the terminal voltages Vb1, Vb2, and Vb3 is lessened. It is therefore possible to reduce a cumulative increase of a difference among the terminal voltages across the respective secondary batteries while the set battery is charged and discharged repetitively as in the background art shown in FIG. 6.

Also, in a case where the imbalance reduction processing is performed at the timing T3 at which the terminal voltage Vb1, which is the lowest voltage among the terminal voltages Vb3, Vb2, and Vb1, has dropped to the cut-off voltage of discharge, Vt, as in the charge system 1 (FIG. 3), in a case where there is a long time since the imbalance reduction processing ends (timing T4) until the charge is started (timing T5), the secondary batteries 141, 142, and 143 undergo self-discharge before the charge is performed, which gives rise to a difference among the terminal voltages Vb1, Vb2, and Vb3. Accordingly, there is a possibility that a difference among the terminal voltages Vb1, Vb2, and Vb3 increases cumulatively in the following charge and discharge operations.

However, by performing the imbalance reduction processing immediately before the charge is started (timing T11) as in the charge system 1a (FIG. 5), even when there is an imbalance caused by the self-discharge, because a difference among the terminal voltages Vb1, Vb2, and Vb3 can be lessened before the charge is started, charge can be performed after an imbalance among the secondary batteries 141, 142, and 143 is reduced. It thus becomes possible to reduce a cumulative increase of a difference among the terminal voltages across the respective secondary batteries while the set battery is charged and discharged repetitively.

Also, as with the battery pack 2 (FIG. 3), in a case where the imbalance reduction processing is performed at the timing T3 at which the terminal voltage Vb1, which is the lowest voltage among the terminal voltages Vb3, Vb2, and Vb1, has dropped to the cut-off voltage of discharge, Vt, for example, when the user starts to charge the battery pack 2 by removing it from the load device and attaching it to the charge device 3 before the terminal voltage Vb1, which is the lowest voltage among the terminal voltages Vb3, Vb2, and Vb1, has dropped to the cut-off voltage of discharge, Vt, the battery pack 2 is charged without the imbalance reduction processing being performed. Consequently, there is a possibility that a difference among the terminal voltages Vb1, Vb2, and Vb3 increases cumulatively in the following charge and discharge operations.

However, by performing the imbalance reduction processing immediately before the charge is started (timing T11) as in the charge system 1a (FIG. 5), even when the user makes an operation to charge the battery pack 2a before the terminal voltage Vb1, which is the lowest voltage among the terminal voltages Vb3, Vb2, and Vb1, has dropped to the cut-off voltage of discharge, Vt, a difference among the terminal voltages Vb1, Vb2, and Vb3 is lessened before the charge is started, so that the charge can be performed after an imbalance among the secondary batteries 141, 142, and 143 is reduced. It thus becomes possible to reduce the possibility that a difference among the terminal voltages across the respective secondary batteries increases cumulatively while the set battery is charged and discharged repetitively.

The imbalance reduction processing shown at the timings T3 and T4 and the timings T10 and T11 described a case where only the secondary battery having the terminal voltage higher than the other secondary batteries is discharged by turning ON the switching element connected in parallel to the secondary battery having the terminal voltage higher than the other secondary batteries. However, it may be configured in such a manner that the resistors R1, R2, and R3 in the discharge portion 23 are set at substantially the same resistance value, so that all the switching elements SW1, SW2, and SW3 are turned ON in the imbalance reduction processing. In this case, the term, "substantially the same resistance value", means that a range of resistance variance caused by an accuracy error or a characteristic variance falls within the same range.

When all the switches SW1, SW2, and SW3 are turned ON, the resistors having substantially the same resistance value are connected in parallel to the respective secondary batteries 141, 142, and 143. Accordingly, a current is flown through each of the resistors R1, R2, and R3 in such a manner that the terminal voltages across the respective secondary batteries become equal. Hence, a discharge current of the secondary battery having a higher terminal voltage becomes larger whereas a discharge current of the secondary battery having a lower terminal voltage becomes smaller. Consequently, a discharge current of the secondary battery that is deteriorated considerably and thereby has a lower terminal voltage is reduced. It thus becomes possible to lessen a difference among the terminal voltages across the respective secondary batteries while reducing the possibility that the considerably deteriorated secondary battery is deteriorated further. An imbalance among the secondary batteries 141, 142, and 143 can be thus reduced.

The set battery control circuit, the set battery control method, the charging circuit, and the battery pack configured as above are suitably used as a set battery control circuit, a set battery control method, and a charging circuit used in battery-mounted devices, such as an electronic device represented by a portable personal computer and a digital camera, an electric car, and a hybrid car as well as a battery pack used as the power supply of these battery-mounted devices, and a charge device that charges the battery pack.

A set battery control circuit according to one aspect of the invention includes: a voltage detection portion that detects a terminal voltage across each secondary battery in a set battery formed by connecting a plurality of secondary batteries in series; a discharge portion that discharges the plurality of secondary batteries; and an imbalance reduction processing portion that performs imbalance reduction processing at set timing preset as timing at which terminal voltages across the plurality of secondary batteries become voltages at or below a cut-off voltage of discharge preset as a voltage at which discharge is to end in such a manner that a secondary battery having a terminal voltage higher than a lowest voltage, which is a lowest voltage among the terminal voltages across the plurality of secondary batteries detected by the voltage detection portion, is discharged by means of the discharge portion so that a difference among the terminal voltages across the respective secondary batteries is lessened.

According to this configuration, a secondary battery having a terminal voltage higher than the lowest voltage, which is the lowest among the terminal voltages across the plurality of secondary batteries detected by the voltage detection portion, is discharged by the imbalance reduction processing portion by means of the discharge portion at the set timing preset as timing at which the terminal voltages across the plurality of secondary batteries become voltages at or below the cut-off voltage of discharge preset as a voltage at which discharge is to end, so that a difference among the terminal voltages across the respective secondary batteries is lessened.

By discharging the set battery formed by connecting a plurality of secondary batteries deteriorated at different degrees in series, the terminal voltage drops faster for a secondary battery deteriorated more. Hence, in the set battery discharged to a state where at least one of the terminal voltages across a plurality of secondary batteries becomes a voltage at or below the cut-off voltage of discharge preset as the voltage at which the discharge is to end, the terminal voltages become lower for the secondary batteries that are deteriorated more. Accordingly, at the set timing at which the terminal voltage becomes a voltage at or below the cut-off voltage of discharge, the secondary battery having the lowest terminal battery is thought to be most deteriorated.

Hence, by discharging the secondary battery having the terminal voltage higher than the lowest voltage, that is, the secondary battery thought to be less deteriorated than the secondary battery having the lowest terminal voltage so as to lessen a difference among the terminal voltages across the respective secondary batteries, it becomes possible to lessen a difference among the terminal voltages across the respective secondary batteries while reducing the possibility that the most deteriorated secondary battery is discharged more and deteriorated further.

Also, it is preferable that the discharge portion discharges the plurality of secondary batteries selectively, and that the imbalance reduction processing portion selectively discharges a secondary battery having the terminal voltage higher than the lowest voltage by means of the discharge portion in the imbalance reduction processing.

According to this configuration, the imbalance reduction processing portion is able to lessen a difference among the terminal voltages across the respective secondary batteries by selectively discharging only the secondary battery having the terminal voltage higher than the lowest voltage by means of the discharge portion.

The discharge portion may be configured to discharge the plurality of secondary batteries in such a manner that a discharge current becomes larger for secondary batteries having higher terminal voltages by connecting resistors having substantially a same resistance value in parallel to the plurality of secondary batteries.

According to this configuration, when the imbalance reduction processing portion performs a discharge operation by means of the discharge portion, resistors having substantially the same resistance value are connected in parallel to a plurality of secondary batteries by the discharge portion. Accordingly, a current is flown through the resistors connected in parallel to the respective secondary batteries in such a manner that the terminal voltages across the respective secondary batteries become equal. Hence, a discharge current becomes larger for a secondary battery having a higher terminal voltage whereas a discharge current becomes smaller for a secondary battery having a lower terminal voltage. Consequently, because a discharge current of the secondary battery that is considerably deteriorated and thereby has a lower terminal voltage is reduced, it becomes possible to lessen a difference among the terminal voltages across the respective secondary batteries while reducing the possibility that a considerably deteriorated secondary battery is deteriorated further.

Also, it is preferable that in a case where the lowest voltage detected by the voltage detection portion is below the cut-off voltage of discharge, the imbalance reduction processing portion discharges only a secondary battery having a terminal voltage higher than the cut-off voltage of discharge by means of the discharge portion until the terminal voltage across the secondary battery drops to the cut-off voltage of discharge in the imbalance reduction processing.

According to this configuration, in a case where the lowest voltage detected by the voltage detection portion is below the cut-off voltage of discharge, the imbalance reduction processing portion discharges only a secondary battery having the terminal voltage higher than the cut-off voltage of discharge by means of the discharge portion until the terminal voltage of this secondary battery drops to the cut-off voltage of discharge. It is therefore possible to reduce the possibility that the secondary battery having the terminal voltage below the cut-off voltage of discharge becomes an overdischarged state as it is discharged further.

Also, it is preferable that the imbalance reduction processing portion performs the imbalance reduction processing at the set timing which is set to a point when at least one of terminal voltages across the plurality of secondary batteries has dropped to or below the cut-off voltage of discharge as the set battery feeds a current to a load.

According to this configuration, when at least one of terminal voltages across a plurality of secondary batteries has dropped to or below the cut-off voltage of discharge as a current is fed from the set battery to a load, that is, at timing at which the terminal voltage of the most deteriorated secondary battery is thought to be the lowest voltage, the second battery having the terminal voltage higher than the lowest voltage, that is, the secondary battery thought to be less deteriorated than the secondary battery having the lowest terminal voltage, is discharged, so that a difference among the terminal voltages across the respective secondary batteries is lessened. It thus becomes possible to lessen a difference among the terminal voltages of the respective secondary batteries while reducing the possibility that the most deteriorated secondary battery is discharged more and deteriorated further.

Also, it may be configured in such a manner that the imbalance reduction processing portion performs the imbalance reduction processing at the set timing which is set to a point when a terminal voltage across the set battery drops to or below a value found by multiplying the cut-off voltage of discharge by the number of the secondary batteries in series as the set battery feeds a current to a load.

According to this configuration, the preset timing can be detected by detecting the terminal voltage across the set battery and comparing the detected terminal voltage with a value found by multiplying the cut-off voltage of discharge by the number of secondary batteries in series. Hence, there is no need to detect the terminal voltages across the plurality of secondary batteries and compare each with the cut-off voltage of discharge in order to detect the set timing. The imbalance reduction processing can be thus simplified.

A charging circuit according to another aspect of the invention includes: the set battery control circuit described above; a charge portion that charges the set battery; and a detection portion that detects timing at which a user makes an operation to charge the set battery using the charge portion as the set timing. The imbalance reduction processing portion performs the imbalance reduction processing when the detection portion detects the set timing. The charge portion charges the set battery after the imbalance reduction processing is performed by the imbalance reduction processing portion.

According to this configuration, when the user makes an operation to charge the set battery using the charge portion, the charge portion charges the set battery after the imbalance reduction processing is performed by the imbalance reduction processing portion. When the user makes an operation to charge the set battery, it is highly likely that the terminal voltage across the set battery has dropped too low to drive the load, that is, it is highly likely that at least one of the terminal voltages across the plurality of secondary batteries has dropped to or below the cut-off voltage of discharge. Hence, as has been described above, it is thought that it is highly likely that the terminal voltage across the most deteriorated secondary battery is the lowest voltage.

Hence, by configuring in such a manner that the set battery is charged after the imbalance reduction processing is performed when the user makes an operation to charge the set battery using the charge portion, it becomes possible to lessen a difference among the terminal voltages across the respective secondary batteries while reducing the possibility that the most deteriorated secondary battery is discharged more and deteriorated further. In addition, by charging the set battery while a difference among the terminal voltages across the respective secondary batteries is lessened, it becomes possible to reduce a cumulative increase of an imbalance among the secondary batteries.

Also, a battery pack according to still another aspect of the invention includes the set battery control circuit described above and the set battery.

According to this configuration, because the imbalance reduction processing can be performed in the battery pack, it becomes possible to lessen a difference among the terminal voltages across the respective secondary batteries while reducing the possibility that the most deteriorated secondary battery is discharged more and deteriorated further in the battery pack.

Also, a battery pack according to still another aspect of the invention is a battery pack connected to a charge device that outputs a charge current to a secondary battery according to a command from an outside and includes: the set battery control circuit described above; the set battery; and a detection portion that detects timing at which a user makes an operation to charge the set battery using the charge portion as the set timing. The imbalance reduction processing portion outputs the command to output the charge current to the charge device after the imbalance reduction processing is performed upon detection of the set timing by the detection portion.

According to this configuration, as has been described, when the user makes an operation to charge the set battery using the charge portion, that is, when the terminal voltage across the most deteriorated secondary battery is thought to be the lowest voltage, the charge portion charges the set battery after a difference among the terminal voltages across the respective secondary batteries is lessened by performing the imbalance reduction processing. Hence, by charging the set battery using the charge device while a difference among the terminal voltages across the respective voltages is lessened, it becomes possible to reduce a cumulative increase of an imbalance among the secondary batteries while reducing the possibility that the most deteriorated secondary battery is discharged more and deteriorated further.

Also, a set battery control method according to still another aspect of the invention includes: a voltage detecting step of detecting each of terminal voltages across a plurality of secondary batteries in a set battery formed by connecting the plurality of secondary batteries in series; and an imbalance reduction processing step of discharging a secondary battery having a terminal voltage higher than a lowest voltage, which is a lowest terminal voltage among the terminal voltages across the plurality of secondary batteries detected in the voltage detecting step, until the terminal voltage across the secondary battery drops to the lowest voltage at set timing preset as timing at which terminal voltages across the plurality of secondary batteries become voltages at or below a cut-off voltage of discharge preset as a voltage at which discharge is to end.

According to this configuration, at the set timing preset as the timing at which the terminal voltages across the plurality of secondary batteries become voltages at or below the cut-off voltage of discharge preset as a voltage at which the discharge is to end, a secondary battery having the terminal voltage higher than the lowest voltage, which is the lowest among the terminal voltages across a plurality of the secondary batteries, is discharged until the terminal voltage of this secondary battery drops to the lowest voltage.

Accordingly, as has been described, a secondary battery having the terminal voltage higher than the lowest voltage, that is, a secondary battery thought to be less deteriorated than the secondary battery having the lowest terminal voltage, is discharged to lessen a difference among the terminal voltages across the respective secondary batteries. It thus becomes possible to lessen a difference among the terminal voltages across the respective secondary batteries while reducing the possibility that the most deteriorated secondary battery is discharged more and deteriorated further.

The invention claimed is:

1. A set battery control circuit comprising:
a voltage detection portion that detects a terminal voltage across each secondary battery in a set battery formed by connecting a plurality of secondary batteries in series;
a discharge portion that discharges the plurality of secondary batteries;
a charge and discharge control portion that causes the voltage detection portion to detect the terminal voltages across the plurality of secondary batteries while the set battery feeds a current to a load, determines a lowest terminal voltage among the terminal voltages across the plurality of secondary batteries detected by the voltage detection portion, causes the set battery to stop feeding the current to the load when at least one of the terminal voltages across the plurality of secondary batteries has dropped to or below a cut-off voltage of discharge preset as a voltage at which discharge is to end, and
an imbalance reduction processing portion that performs imbalance reduction processing, at set timing preset as timing at which or after the feeding of the current to the load from the set battery is stopped by the charge and discharge control portion and as timing before the set battery is charged in which a secondary battery having a terminal voltage higher than the lowest terminal voltage is discharged by means of the discharge portion so that a difference among the terminal voltages across the respective secondary batteries is lessened.

2. The set battery control circuit according to claim 1, wherein:
the discharge portion discharges the plurality of secondary batteries selectively; and the imbalance reduction processing portion selectively discharges a secondary battery having the terminal voltage higher than the lowest terminal voltage by means of the discharge portion in the imbalance reduction processing.

3. The set battery control circuit according to claim 1, wherein:
the discharge portion includes resistors each of which has substantially a same resistance value and discharges the plurality of secondary batteries in such a manner that a discharge current becomes larger for secondary batteries having higher terminal voltages by connecting the resistors in parallel to the plurality of secondary batteries, respectively.

4. The set battery control circuit claim 1, wherein:
in a case where the lowest terminal voltage determined by the charge and discharge control portion is below the cut-off voltage of discharge, the imbalance reduction processing portion discharges only a secondary battery having a terminal voltage higher than the cut-off voltage of discharge by means of the discharge portion until the terminal voltage across the secondary battery drops to the cut-off voltage of discharge in the imbalance reduction processing.

5. The set battery control circuit according to claim 1, wherein:
the imbalance reduction processing portion performs the imbalance reduction processing at the set timing at which the feeding of the current to the load from the set battery is stopped by the charge and discharge control portion.

6. The set battery control circuit according to claim 1, wherein:
the charge and discharge control portion causes the set battery to stop feeding the current to the load when a terminal voltage across the set battery drops to or below a value found by multiplying the cut-off voltage of discharge by the number of the secondary batteries in series, and
the imbalance reduction processing portion performs the imbalance reduction processing at the set timing at which the feeding of the current to the load from the set battery is stopped by the charge and discharge control portion.

7. A charging circuit, characterized by comprising:
the set battery control circuit set forth in claim 1;
a charge portion that charges the set battery; and
a detection portion that detects timing at which a user makes an operation to charge the set battery using the charge portion as the set timing,
wherein:
the imbalance reduction processing portion performs the imbalance reduction processing when the detection portion detects the set timing; and
the charge portion charges the set battery after the imbalance reduction processing is performed by the imbalance reduction processing portion.

8. A battery pack, including:
the set battery control circuit set forth in claim 1; and
the set battery.

9. A battery pack connected to a charge device that outputs a charge current to a secondary battery according to a command from an outside, comprising:
the set battery control circuit set forth in claim 1;
the set battery; and
a detection portion that detects timing at which a user makes an operation to charge the set battery using the charge portion as the set timing,
wherein the imbalance reduction processing device outputs the command to output the charge current to the charge device after the imbalance reduction processing is performed upon detection of the set timing by the detection portion.

10. A set battery control method comprising:
a voltage detecting step of detecting each of terminal voltages across a plurality of secondary batteries in a set battery formed by connecting the plurality of secondary batteries in series while the set battery feeds a current to a load;
a determining a lowest terminal voltage among the voltages across the plurality of secondary batteries detected by the voltage detecting step,
a stopping step of causing the set battery to stop feeding the current to the load when at least one of the terminal voltages across the plurality of secondary batteries has dropped to or below a cut-off voltage of discharge preset as a voltage at which discharge is to end, and
an imbalance reduction processing step of discharging a secondary battery having a terminal voltage higher than the lowest terminal voltage, until the terminal voltage across the secondary battery drops to the lowest terminal voltage at set timing preset as timing at which or after feeding of the current to the load from the set battery is stopped in the stopping step and as timing before the set battery is charged.

* * * * *